Feb. 8, 1927.

J. L. MACOMBER 1,616,663

OVEN FOR BARBECUED MEATS

Filed Sept. 25, 1926

Inventor
J. L. MACOMBER
By M. Talbert Dick
Attorney

Patented Feb. 8, 1927.

1,616,663

UNITED STATES PATENT OFFICE.

JAMES LOCKE MACOMBER, OF DES MOINES, IOWA.

OVEN FOR BARBECUED MEATS.

Application filed September 25, 1926. Serial No. 137,681.

The object of this invention is to provide an improved construction for an oven especially adapted for use in preparing meats by broiling, roasting or the like for use in barbecued sandwiches.

More specifically, this invention has for its object the provision of a removable drawer in an oven which is formed with a perforated grate to receive the fuel, beneath which the currents of air are evenly distributed, together with convenient means for removing the ash from beneath the grate.

With these and other objects in view, my invention consists in the construction, arrangement and combination of elements hereinafter set forth, pointed out in the claims and illustrated by the accompanying drawing, in which—

Figure 1:
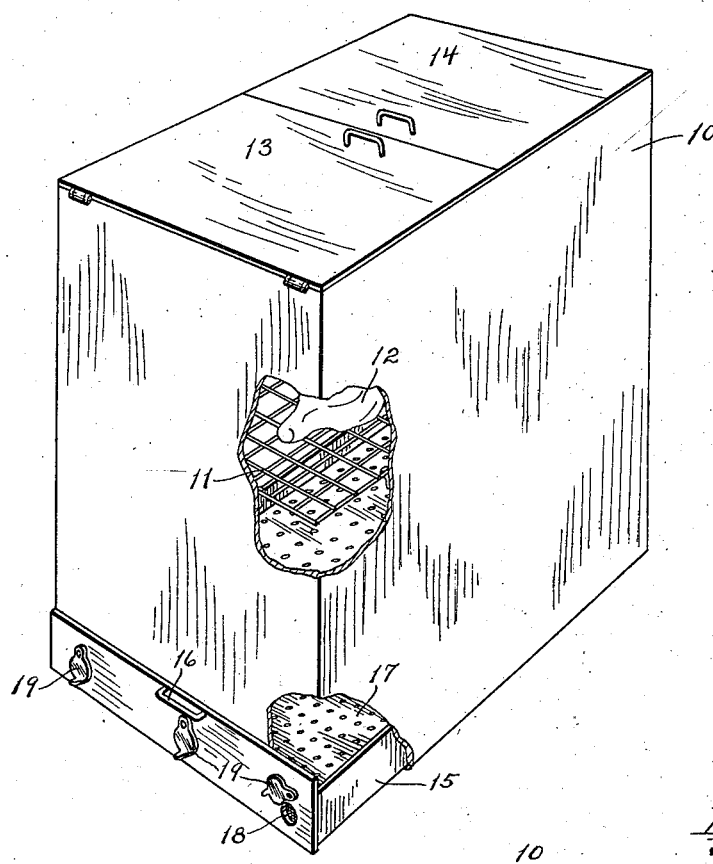
Figure 1 is a perspective view of my improved oven, portions being broken away to illustrate the interior construction.
Figure 2:
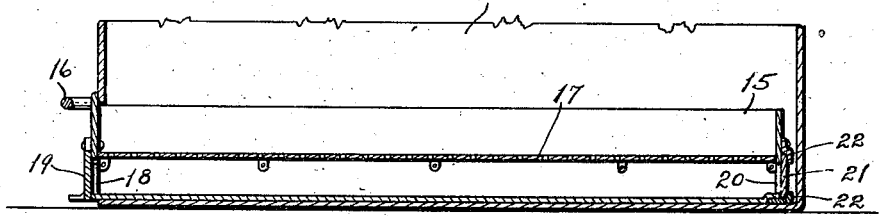
Figure 2 is a horizontal section through the lower portion of the device.
Figure 3:
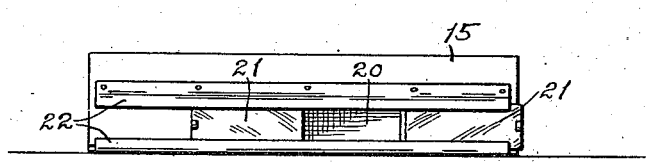
Figure 3 is a rear end view of the drawer removed from the oven and showing particularly the means for removing the ash.

In the construction of the device as shown an oven housing 10 is provided which may be of any suitable dimensions and preferably constructed of sheet metal. Arranged horizontally within the housing 10 is a shelf 11 of skeleton form on which the meat to be cooked, such as 12, is adapted to be placed. Access may be had to the upper part of the housing by means of hinged doors 13 and 14 at its top. A drawer 15 is removably mounted in the lower part of the housing and is provided at its front end with a handle 16 by means of which it may be slidably removed and replaced. Arranged within the drawer 15 is a grate 17 which may be of perforated or reticulated construction. The drawer 15 is formed at its forward end with air openings 18 which open to the drawer beneath the grate 17 and are adapted to be closed by means of pivoted dampers 19.

In practical use the meat to be cooked is placed upon the shelf 11 and a fire is built on the grate 17 and the drawer is closed. The dampers 10 are adjusted to admit the desired quantity of air through the openings 18 to the lower part of the drawer, the air currents passing upwardly through the grate and being distributed evenly throughout the grate and the fire thereon. This is advantageous in producing a uniform combustion on the grate and complete consumption of the fuel, as well as uniform cooking of the meat.

At its rear end the drawer 15 is formed with an elongated opening 20 arranged beneath the level of the grate 17. The opening 20 normally is closed by means of sliding plates 21 arranged in slide bearings 22 on the rear wall of the drawer. Ash which accumulates in the drawer beneath the grate 17 may be removed from time to time by taking out the drawer, opening the slide plates 21 and dumping the ash through the opening 20.

I claim as my invention—

1. In an oven, a housing, a drawer slidably mounted in the lower portion of the housing, said drawer being formed with a grate spaced above its bottom, means for admitting air to said drawer beneath said grate together with an ash outlet formed in one wall of said drawer beneath the level of said grate.

2. In an oven, a housing, and drawer slidably mounted in the lower portion of the housing said drawer being formed with a grate spaced above its bottom, means for admitting air to said drawer beneath said grate, an ash outlet formed in one wall of said drawer beneath the level of said grate, and means for normally closing said ash outlet.

3. In an oven, a removable drawer open at its top and formed with a perforated grate horizontally arranged and spaced above its bottom, air openings formed in one wall of said drawer beneath the level of said grate, and dampers for regulating the admission of air through said openings, an ash opening formed in the opposite wall of said drawer beneath the level of said grate, and a sliding plate for normally closing said ash opening.

JAMES LOCKE MACOMBER.